United States Patent
Takemura

(10) Patent No.: US 12,159,234 B2
(45) Date of Patent: Dec. 3, 2024

(54) STOCHASTIC OPTIMIZATION DEVICE, STOCHASTIC OPTIMIZATION METHOD AND STOCHASTIC OPTIMIZATION PROGRAM

(71) Applicant: NEC Corporation, Tokyo (JP)

(72) Inventor: Kei Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1078 days.

(21) Appl. No.: 17/041,810

(22) PCT Filed: May 15, 2018

(86) PCT No.: PCT/JP2018/018697
§ 371 (c)(1),
(2) Date: Sep. 25, 2020

(87) PCT Pub. No.: WO2019/220525
PCT Pub. Date: Nov. 21, 2019

(65) Prior Publication Data
US 2021/0056435 A1 Feb. 25, 2021

(51) Int. Cl.
*G06N 5/01* (2023.01)
(52) U.S. Cl.
CPC ...................... *G06N 5/01* (2023.01)
(58) Field of Classification Search
CPC ........... G06N 5/01; G06N 20/00; G06F 17/11
See application file for complete search history.

(56) References Cited

U.S. PATENT DOCUMENTS 11,562,230 B2* 1/2023 Mohassel ............... H04L 9/008
2006/0173661 A1* 8/2006 Kohn .................... G05B 13/024
703/2

(Continued)

FOREIGN PATENT DOCUMENTS

WO 2015/186338 A1 12/2015
WO 2017/183587 A1 10/2017

OTHER PUBLICATIONS

Second-Order Stochastic Optimization for Machine Learning in Linear Time, Agarwal et al. (Year: 2017).*

(Continued)

*Primary Examiner* — Tan H Tran

(57) ABSTRACT

A differential information extraction unit 81 receives input of a function and a provisional solution of the function, and calculates a first-order differential and a second-order differential in the provisional solution of the input function. An end condition determination unit 82 determines whether to continue updating of a solution in the function, based on the provisional solution. A number-of-updates decision unit 83 decides a number of updates of the provisional solution, based on the provisional solution, the first-order differential, and the second-order differential. A provisional solution updating unit 84 repeatedly performs a process of updating the provisional solution as many times as the decided number of updates based on the first-order differential and the second-order differential, and outputs the updated provisional solution as an optimum solution. The end condition determination unit 82 determines whether to continue the updating of the solution in the function, based on the updated provisional solution.

9 Claims, 3 Drawing Sheets

(56) References Cited

U.S. PATENT DOCUMENTS

2011/0044524 A1* 2/2011 Wang ................ G01R 33/5601
382/131
2019/0156240 A1 5/2019 Ida et al.
2019/0311269 A1 10/2019 Kameda

OTHER PUBLICATIONS

International Search Report for PCT Application No. PCT/JP2018/018697, mailed on Jul. 31, 2018.
R.Johnson, & T.Zhang, "Accelerating Stochastic Gradient Descent using Predictive Variance Reduction", Advances in Neural Information Processing Systems, pp. 315-323, 2013, USA.
Z.Allen-Zhu, & Y.Yuan, "Improved SVRG for Non-strongly-convex or Sum-of-non-convex Objectives", International Conference on Machine Learning, pp. 1080-1089, 2016, USA.
Y.Xu, Q.Lin, & T.Yang, Supplementary Materials "Adaptive SVRG Methods under Error Bound Conditions with Unknown Growth Parameter", Advances in Neural Information Processing Systems, pp. 3279-3289, 2017, USA.

* cited by examiner

STOCHASTIC OPTIMIZATION DEVICE, STOCHASTIC OPTIMIZATION METHOD AND STOCHASTIC OPTIMIZATION PROGRAM

This application is a National Stage Entry of PCT/JP2018/018697 filed on May 15, 2018, the contents of all of which are incorporated herein by reference, in their entirety.

TECHNICAL FIELD

The present invention relates to a stochastic optimization device, a stochastic optimization method, and a stochastic optimization program for performing stochastic optimization.

BACKGROUND ART

Stochastic optimization is known as one of the mathematical optimization techniques. Stochastic optimization is a technique used when minimizing a value of a function made up of the sum total of many functions, as seen in machine learning and the like. Machine learning requires a lot of time for evaluation and calculation of functions even with use of computers. It is therefore desirable to output a more accurate result while reducing the time to minimize the function value.

For example, Non Patent Literature (NPL) 1 describes a method for accelerating stochastic gradient descent using predictive variance. With the method described in NPL 1, a non-stochastic first-order differential is calculated once in several times, and this information is used thereafter, thus reducing the number of times a solution is improved as compared with typical stochastic optimization. There are also various known methods for improving a solution in the case where a parameter representing the structure of a function is unknown (see NPL 2 and NPL 3).

Patent Literature (PTL) 1 describes a learning device that realizes efficient learning. The learning device described in PTL 1 adjusts a learning rate by dividing the learning rate by a standard deviation of a primary gradient, thus enabling convergence of a parameter with a smaller number of repetitions.

CITATION LIST

Patent Literature

PTL1: WO 2017/183587 A1

Non Patent Literature

NPL 1: Johnson, R., & Zhang, T., "Accelerating Stochastic Gradient Descent using Predictive Variance Reduction", Advances in Neural Information Processing Systems, pp. 315-323, 2013.

NPL 2: Allen-Zhu, Z., & Yuan, Y, "Improved SVRG for Non-strongly-convex or Sum-of-non-convex Objectives", International Conference on Machine Learning, pp. 1080-1089, 2016.

NPL 3: Xu, Y., Lin, Q., & Yang, T., "Adaptive SVRG Methods under Error Bound Conditions with Unknown Growth Parameter", Advances in Neural Information Processing Systems, pp. 3279-3289, 2017.

SUMMARY OF INVENTION

Technical Problem

With the method described in NPL 1, whether the calculation of the non-stochastic gradient is needed once in several times depends on the structure of the function to be minimized. That is, the method described in NPL 1 is based on the precondition that the parameter representing the structure of the function is known. However, the parameter representing the structure of the function is not necessarily known.

With the methods described in NPL 2 and NPL 3, the solution can be improved even in the case where the parameter representing the structure of the function is not given. In typical stochastic optimization, however, there is a problem in that, in the case where the parameter representing the structure of the function is not given, the number of improvements of the solution that are needed is much larger than the number of improvements of the solution in the case where the parameter representing the structure of the function is given. This is because the parameter representing the structure of the function cannot be estimated with only a vector of first-order differential information.

Thus, the foregoing typical method is likely to take a lot of time because the number of improvements (the number of updates) of the calculation performed before a final solution is obtained increases significantly. It is desirable to reduce the number of updates before a final solution satisfying desired accuracy is obtained even in the case where the parameter representing the structure of the function is not given.

The present invention therefore has an object of providing a stochastic optimization device, a stochastic optimization method, and a stochastic optimization program that can reduce the number of updates before a final solution satisfying desired accuracy is obtained even in the case where a parameter representing the structure of a function is not given.

Solution to Problem

A stochastic optimization device according to the present invention includes: a differential information extraction unit for receiving input of a function and a provisional solution of the function, and calculating a first-order differential and a second-order differential in the provisional solution of the function that is input; an end condition determination unit for determining whether to continue updating of a solution in the function, based on the provisional solution; a number-of-updates decision unit for deciding a number of updates of the provisional solution, based on the provisional solution, the first-order differential, and the second-order differential; and a provisional solution updating unit for repeatedly performing a process of updating the provisional solution as many times as the decided number of updates based on the first-order differential and the second-order differential, and outputting the updated provisional solution, wherein the end condition determination unit determines whether to continue the updating of the solution in the function, based on the updated provisional solution.

A stochastic optimization method according to the present invention includes: receiving input of a function and a provisional solution of the function, and calculating a first-order differential and a second-order differential in the provisional solution of the function that is input; deciding a number of updates of the provisional solution, based on the provisional solution, the first-order differential, and the second-order differential; repeatedly performing a process of updating the provisional solution as many times as the decided number of updates based on the first-order differential and the second-order differential; determining whether to continue updating of a solution in the function, based on the updated provisional solution; and outputting the updated provisional solution.

A stochastic optimization program according to the present invention causes a computer to carry out: a differential information extraction process of receiving input of a function and a provisional solution of the function, and calculating a first-order differential and a second-order differential in the provisional solution of the function that is input; an end condition determination process of determining whether to continue updating of a solution in the function, based on the provisional solution; a number-of-updates decision process of deciding a number of updates of the provisional solution, based on the provisional solution, the first-order differential, and the second-order differential; and a provisional solution updating process of repeatedly performing a process of updating the provisional solution as many times as the decided number of updates based on the first-order differential and the second-order differential, and outputting the updated provisional solution, wherein the computer is caused to, in the end condition determination process, determine whether to continue the updating of the solution in the function, based on the updated provisional solution.

Advantageous Effects of Invention

According to the present invention, it is possible to reduce the number of updates before a final solution satisfying desired accuracy is obtained even in the case where a parameter representing the structure of a function is not given.

DESCRIPTION OF EMBODIMENT

An exemplary embodiment of the present invention will be described below, with reference to the drawings.

Figure 1:
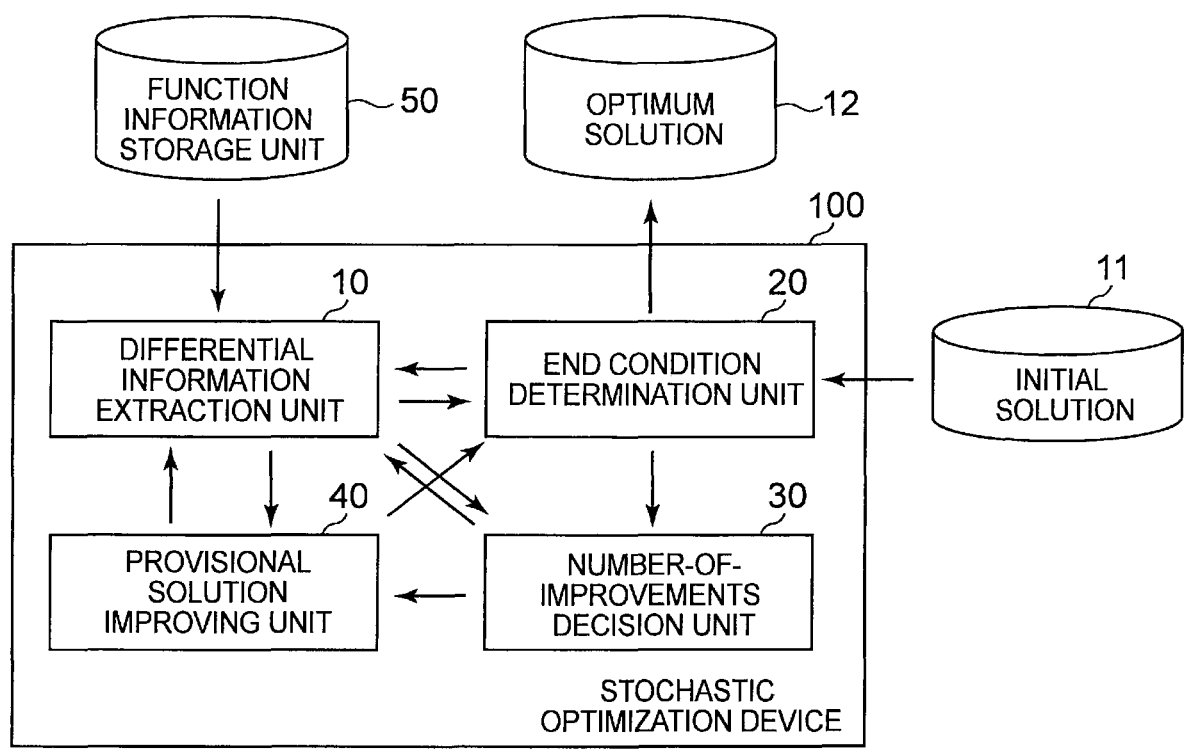
FIG. 1 It is a block diagram depicting an exemplary embodiment of a stochastic optimization device according to the present invention.

FIG. 1 is a block diagram depicting an exemplary embodiment of a stochastic optimization device according to the present invention. Each unidirectional arrow in FIG. 1 simply indicates the direction of flow of a signal (data), and does not preclude interactivity.

A stochastic optimization device 100 in this exemplary embodiment includes a differential information extraction unit 10, an end condition determination unit 20, a number-of-improvements decision unit 30, and a provisional solution improving unit 40. The stochastic optimization device 100 may include a function information storage unit 50 for storing function information.

The function information stored in the function information storage unit 50 is information indicating a function subjected to optimization, and may be information representing the function itself or information designating the function. The function information storage unit 50 is implemented, for example, by a magnetic disk or the like.

The differential information extraction unit 10 receives input of a function and a provisional solution of the function as an initial solution 11. The function that is input may be information representing the function itself or information designating the function, as mentioned above. The differential information extraction unit 10 then outputs differential information in the provisional solution of the function that is input. Specifically, the differential information extraction unit 10 calculates information of a first-order differential and information of a second-order differential in the provisional solution of the function that is input.

The end condition determination unit 20 determines whether to continue updating of the solution in the input function in order to improve the solution, based on the provisional solution. Specifically, in the case where the end condition determination unit 20 can determine that the provisional solution has converged to an optimum solution, the end condition determination unit 20 determines to end updating of the solution. Here, the end condition determination unit 20 may use the differential information to determine whether to continue updating of the solution. For example, the end condition determination unit 20 may determine to end updating of the solution in the case where the norm of the first-order differential is sufficiently small.

The end condition determination unit 20 may also determine whether to continue updating of the solution using the information of the second-order differential. An example of a method of determining the end condition from the information of the second-order differential is a method using Newton decrement. The Newton decrement is defined by the following Formula 1.

[Math. 1]

$$\lambda(x)=\|\nabla f(x)\|_{\nabla^2 f(x)^{-1}}=(\nabla f(x)^T \nabla^2 f(x)^{-1} \nabla f(x))^{1/2} \qquad \text{(Formula 1)}$$

The end condition is defined by the following Formula 2. The end condition determination unit 20 may determine to end updating of the solution when the value of the left side in Formula 2 is sufficiently small.

[Math. 2]

$$\frac{\lambda^2(x)}{2} \leq \epsilon \qquad \text{(Formula 2)}$$

The number-of-improvements decision unit 30 decides the number of updates for improving the solution, based on the differential information (i.e. the information of the first-order differential and the information of the second-order differential) in the provisional solution extracted by the differential information extraction unit 10. Specifically, the number-of-improvements decision unit 30 decides the number of updates of the solution based on a predetermined criterion, using a maximum eigenvalue of a second-order differential matrix as an estimate of a parameter L of the function.

For example, the number-of-improvements decision unit 30 may decide the number of updates of the solution based on a criterion represented by the following Formula 3 described in NPL 1. In Formula 3, m denotes the number of updates, η denotes the learning rate, and γ is a parameter.

[Math. 3]

$$\alpha = \frac{1}{\gamma\eta(1-2L\eta)m} + \frac{2L\eta}{1-2L\eta} < 1 \quad \text{(Formula 3)}$$

The number-of-improvements decision unit 30 outputs the decided number of updates to the provisional solution improving unit 40 together with the provisional solution.

The provisional solution improving unit 40 receives input of the provisional solution and the number of updates of the solution, updates the provisional solution as many times as the input number of updates, and then outputs the result. To improve the provisional solution, the provisional solution improving unit 40 uses the differential information extracted by the differential information extraction unit 10. Specifically, the provisional solution improving unit 40 updates the provisional solution based on the following Formula 4, where y is the updated provisional solution.

$$y=y-(H(y-x)+g)/L \quad \text{(Formula 4)}.$$

In Formula 4, x is the provisional solution when the number of updates is decided. That is, y can be regarded as the current provisional solution. H is a second-order differential matrix in y, and g is a first-order differential vector in x. H may be stochastic. L is a parameter of the function estimated when the number of updates is decided.

In detail, using a value obtained by multiplying, by the difference between the provisional solution x (hereafter referred to as "first provisional solution") when the number of updates is decided and the current provisional solution y (hereafter referred to as "second provisional solution"), the second-order differential matrix in the second provisional solution and adding the first-order differential vector in the first provisional solution to the multiplication result, the provisional solution improving unit 40 updates the second provisional solution that is the current provisional solution.

The provisional solution improving unit 40 updates the provisional solution based on Formula 4, as many times as the decided number of updates. The provisional solution improving unit 40 may then output the average of y (excluding x) successively calculated based on x, as a final provisional solution (i.e. optimum solution 12).

Further, as a method of approximating the differential information, the provisional solution improving unit 40 may use a method of stochastically designating the function. There are cases where an objective function is represented by the sum (or average) of many functions (hereafter referred to as "partial functions"). In such cases, the differential information of the function is the sum (or average) of the differential information of all of the partial functions. When the number of partial functions is larger, higher cost is required to calculate the differential information of the function. Accordingly, the provisional solution improving unit 40 may stochastically select only part of the partial functions and use the differential information of the selected functions, to approximate the differential information to be calculated in the first place. In the case of the first-order differential, for example, this method is called stochastic gradient. A function assumed in the below-described example is the average of functions determined per data.

The differential information extraction unit 10, the end condition determination unit 20, the number-of-improvements decision unit 30, and the provisional solution improving unit 40 are implemented by a processor (e.g. central processing unit (CPU), graphics processing unit (GPU), or a field-programmable gate array (FPGA)) in a computer operating according to a program (stochastic optimization program).

For example, the program may be stored in a storage unit (not depicted) included in the stochastic optimization device, with the processor reading the program and, according to the program, operating as the differential information extraction unit 10, the end condition determination unit 20, the number-of-improvements decision unit 30, and the provisional solution improving unit 40. The functions of the stochastic optimization device may be provided in the form of SaaS (Software as a Service).

The differential information extraction unit 10, the end condition determination unit 20, the number-of-improvements decision unit 30, and the provisional solution improving unit 40 may each be implemented by dedicated hardware. All or part of the components of each device may be implemented by general-purpose or dedicated circuitry, processors, or combinations thereof. They may be configured with a single chip, or configured with a plurality of chips connected via a bus. All or part of the components of each device may be implemented by a combination of the above-mentioned circuitry or the like and program.

In the case where all or part of the components of the stochastic optimization device is implemented by a plurality of information processing devices, circuitry, or the like, the plurality of information processing devices, circuitry, or the like may be centralized or distributed. For example, the information processing devices, circuitry, or the like may be implemented in a form in which they are connected via a communication network, such as a client-server system or a cloud computing system.

Figure 2:
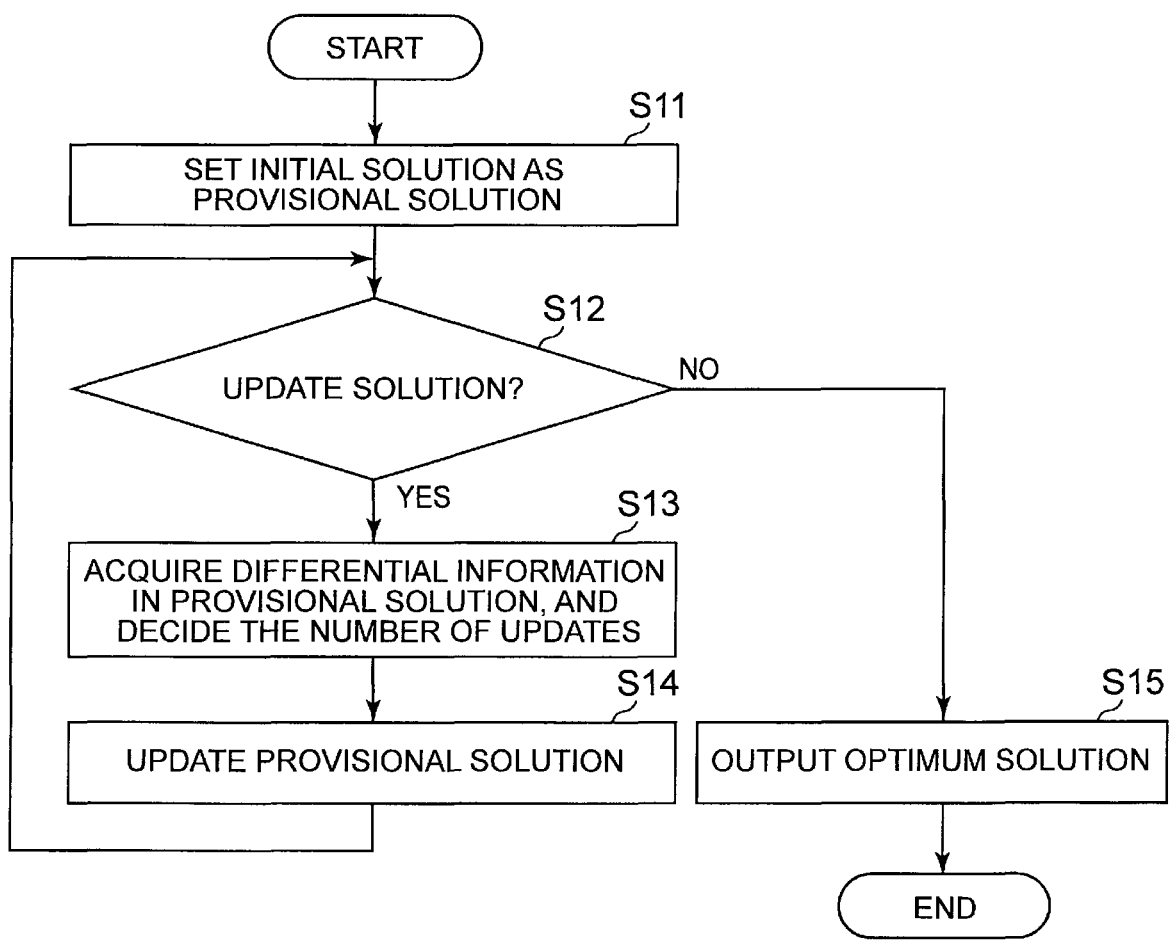
FIG. 2 It is a flowchart depicting an example of operation of the stochastic optimization device.

Operation of the stochastic optimization device in this exemplary embodiment will be described below. FIG. 2 is a flowchart depicting an example of the operation of the stochastic optimization device in this exemplary embodiment. First, the end condition determination unit 20 receives an initial solution, and sets the initial solution as a provisional solution (step S11). The end condition determination unit 20 then determines whether to update the solution (step S12). In the case where the end condition determination unit 20 determines not to update the solution (step S12: No), the provisional solution improving unit 40 outputs the provisional solution as an optimum solution (step S15), and ends the process.

In the case where the end condition determination unit 20 determines to update the solution (step S12: Yes), the number-of-improvements decision unit 30 inputs the provisional solution to the differential information extraction unit 10, and the differential information extraction unit 10 acquires differential information of the function based on the input provisional solution. The number-of-improvements decision unit 30 then decides the number of updates of the solution, based on the extracted differential information (specifically, both information of a first-order differential and information of a second-order differential) (step S13).

The provisional solution improving unit 40 updates the provisional solution as many times as the decided number of updates, using the differential information in the provisional solution. The provisional solution improving unit 40 then outputs the updated provisional solution to the end condition determination unit 20 (step S14). Subsequently, the process from step S12 in which the end condition determination unit 20 determines whether to further update the provisional solution is repeated.

As described above, in this exemplary embodiment, the differential information extraction unit 10 receives input of a function and a provisional solution of the function, and calculates a first-order differential and a second-order differential in the provisional solution of the function that is input. The number-of-improvements decision unit 30 decides the number of updates of the provisional solution, based on the provisional solution, the first-order differential, and the second-order differential. The provisional solution improving unit 40 repeatedly performs a process of updating the provisional solution as many times as the decided number of updates, based on the first-order differential and the second-order differential. The end condition determination unit 20 determines whether to continue updating of the solution in the function, based on the updated provisional solution. In the case where the end condition determination unit 20 determines to end updating of the solution, the provisional solution improving unit 40 outputs the updated provisional solution as an optimum solution. Thus, the number of updates before a final solution satisfying desired accuracy is obtained can be reduced even in the case where a parameter representing the structure of the function is not given.

That is, in this exemplary embodiment, even in the case where the parameter representing the structure of the function is not given, the required number of updates of the solution and the accuracy of the final solution can be the same as in stochastic optimization in the case where the parameter representing the structure of the function is given. A parameter representing the structure of a function, such as a strongly convex parameter or a Lipschitz constant for Lipschitz continuity of a gradient, cannot be estimated with only a vector of first-order differential information. In the case where a matrix of second-order differential information is also included, on the other hand, the parameter representing the structure of the function can be estimated from an eigenvalue of the matrix.

Example

The present invention will be described by way of a specific example below. The scope of the present invention is, however, not limited to the following description. This example relates to learning a model in which an L2 regularization term is added to a logistic regression generated based on data shown below as an example. Data shown in Table 1 is data indicating feature values. Data shown in Table 2 is training data for the data shown in Table 1.

TABLE 1

| | Feature value data | |
|---|---|---|
| Feature value | Value in first dimension | Value in second dimension |
| First sample | 0.443863232745 | 0.333674327374 |
| Second sample | 0.144043571161 | 1.45427350696 |
| Third sample | 0.950088417526 | 0.761037725147 |
| Fourth sample | 0.121675016493 | −0.151357208298 |
| Fifth sample | −0.103218851794 | 0.410598501938 |

TABLE 2

| Training data | |
|---|---|
| Training data | Value |
| First sample | 1 |
| Second sample | −1 |
| Third sample | 1 |
| Fourth sample | 1 |
| Fifth sample | −1 |

Specifically, the foregoing data was used to solve an objective function represented by the following Formula 5.

[Math. 4]

$$\min_{w \in R^2} -\frac{1}{5}\sum_{i=1}^{5} \log(y_i(x_i w^T)) + \frac{1}{2}\|w\|_2^2 \text{ where}$$ (Formula 5)

$y_1 = 1, y_1 = -1, y_1 = 1, y_1 = -1$
$x_1 = (0.443863232745, 0.333674327374)$
$x_2 = (0.144043571161, 1.45427350696)$
$x_3 = (0.950088417526, 0.761037725147)$
$x_4 = (0.121675016493, -0.151357208298)$
$x_5 = (-0.103218851794, 0.410598501938)$

To compare the case where the parameter representing the structure of the function is given and the case where the parameter representing the structure of the function is not given, the following description will be made in comparison with the method described in NPL 1. The parameters necessary for deciding the number of updates of the solution in the method described in NPL 1 are two parameters in the following Formulas 6 and 7, and the number of updates is 161 according to the criterion in the foregoing Formula 3.

$L=1.20714093025$ (Formula 6).

$\gamma=1.0$ (Formula 7).

Next, to describe the stochastic optimization method according to the present invention, consider the case where the parameter in Formula 6 is unknown (the parameter in Formula 7 is known). First, the stochastic optimization device 100 received input of any initial solution. The end condition determination unit 20 determined whether to end updating of the solution. In this example, the end condition was set to "ending updating of the solution in the case where the norm of the first-order differential is sufficiently small". In the case where the initial solution did not satisfy this condition, the number-of-improvements decision unit 30 performed a process of deciding the number of updates.

The number-of-improvements decision unit 30 estimated the parameter L from the maximum eigenvalue of the second-order differential matrix of the objective function in the foregoing Formula 5. Specifically, the number-of-improvements decision unit 30 estimated the parameter L in the following Formula 8, from the maximum eigenvalue of the second-order differential matrix of the objective function in the foregoing Formula 5.

$L=1.12299639326$ (Formula 8).

From the estimated value of the parameter L and $\gamma=1.0$, the number-of-improvements decision unit 30 decided the number of updates of the solution to be 161, based on the criterion described in NPL 1 (i.e. the criterion indicated in the foregoing Formula 3). This result is the same as in the case where the parameter representing the structure of the function is given. That is, if the provisional solution improvement method is the same as the method described in NPL 1, the number of updates is the same as that in the improvement method, so that the same solution can be eventually obtained.

Consider the case where, as the provisional solution improvement method, the improvement method described in NPL 1 was used for a function obtained as a result of quadratic approximation of the objective function in the foregoing Formula 5 by the provisional solution. In this case, the information of the second-order differential is needed, unlike the method described in NPL 1. In the case of using the method described in NPL 1 on the assumption that the parameter in the foregoing Formula 6 was known, the processing time was approximately 1.1 seconds, and the optimum value was approximately 0.7872913.

In the case of updating the provisional solution by the stochastic optimization method according to the present invention on the assumption that the parameter in the foregoing Formula 6 was not given, on the other hand, the processing time was approximately 0.7 seconds, and the optimum value was approximately 0.7872912. This demonstrates that the use of the stochastic optimization method according to the present invention can produce substantially the same solution in a shorter time than the use of the method described in NPL 1.

The methods described in NPL 2 and NPL 3, for example, can be used only in the case where the value of L is known and the value of γ is unknown. In other words, L cannot be estimated with the methods described in NPL 2 and NPL 3.

Figure 3:
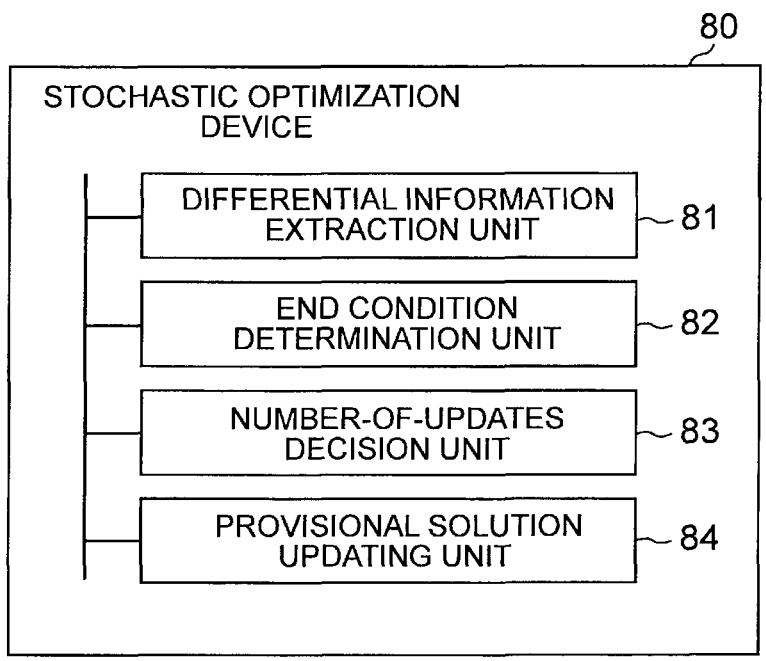
FIG. 3 It is a block diagram depicting an overview of a stochastic optimization device according to the present invention.

An overview of the present invention will be described below. FIG. 3 is a block diagram depicting an overview of a stochastic optimization device according to the present invention. A stochastic optimization device 80 (e.g. stochastic optimization device 100) according to the present invention includes: a differential information extraction unit 81 (e.g. differential information extraction unit 10) for receiving input of a function and a provisional solution of the function, and calculating a first-order differential and a second-order differential in the provisional solution of the function that is input; an end condition determination unit 82 (e.g. end condition determination unit 20) for determining whether to continue updating of a solution in the function, based on the provisional solution; a number-of-updates decision unit 83 (e.g. number-of-improvements decision unit 30) for deciding a number of updates of the provisional solution, based on the provisional solution, the first-order differential, and the second-order differential; and a provisional solution updating unit 84 (e.g. provisional solution improving unit 40) for repeatedly performing a process of updating the provisional solution as many times as the decided number of updates based on the first-order differential and the second-order differential, and outputting the updated provisional solution.

The end condition determination unit 82 determines whether to continue the updating of the solution in the function, based on the updated provisional solution.

With such a structure, even in the case where a parameter representing the structure of the function is not given, the number of updates before a final solution satisfying desired accuracy is obtained can be reduced. That is, according to the present invention, even in the case where the parameter representing the structure of the function is not given, the number of updates of the solution and the final solution can be obtained with the same level of accuracy as in the case where the parameter representing the structure of the function is given.

The number-of-updates decision unit 83 may estimate a parameter of the function from a maximum eigenvalue of a second-order differential matrix, and decide the number of updates of the solution using the estimated parameter.

The provisional solution updating unit 84 may stochastically designate the function, to approximate differential information.

The provisional solution updating unit 84 may update a second provisional solution (e.g. y in Formula 4) that is a current provisional solution, using a value obtained by multiplying a second-order differential matrix (e.g. H in Formula 4) in the second provisional solution (y) by a difference between a first provisional solution (e.g. x in Formula 4) that is a provisional solution when the number of updates is decided and the second provisional solution (y) that is the current provisional solution and adding a first-order differential vector (e.g. g in Formula 4) in the first provisional solution (x) to a result of the multiplication.

The provisional solution updating unit 84 may output an average of calculated second provisional solutions.

The end condition determination unit 82 may determine to end the updating of the solution, in the case where the end condition determination unit 82 is able to determine that the provisional solution has converged to an optimum solution.

Figure 4:
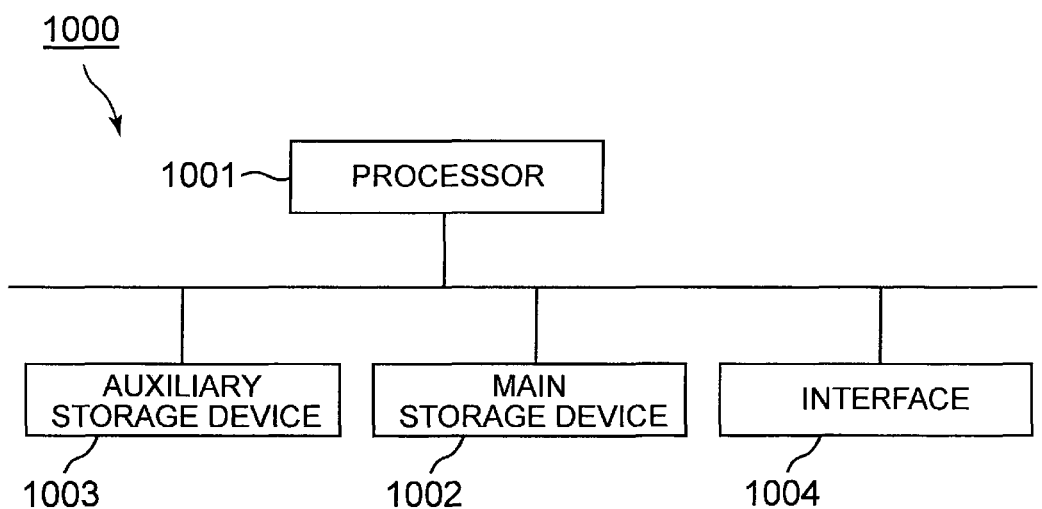
FIG. 4 It is a schematic block diagram depicting a structure of a computer according to at least one exemplary embodiment.

FIG. 4 is a schematic block diagram depicting a structure of a computer according to at least one exemplary embodiment. A computer 1000 includes a processor 1001, a main storage device 1002, an auxiliary storage device 1003, and an interface 1004.

The stochastic optimization device described above is implemented by the computer 1000. The operation of each processing unit described above is stored in the auxiliary storage device 1003 in the form of a program (stochastic optimization program). The processor 1001 reads the program from the auxiliary storage device 1003, expands the program in the main storage device 1002, and executes the above-described process according to the program.

In at least one exemplary embodiment, the auxiliary storage device 1003 is an example of a non-transitory tangible medium. Examples of the non-transitory tangible medium include a magnetic disk, magneto-optical disk, CD-ROM (compact disc read-only memory), DVD-ROM (read-only memory), and semiconductor memory connected via the interface 1004. In the case where the program is distributed to the computer 1000 through a communication line, the computer 1000 to which the program has been distributed may expand the program in the main storage device 1002 and execute the above-described process.

The program may realize part of the above-described functions. The program may be a differential file (differential program) that realizes the above-described functions in combination with another program already stored in the auxiliary storage device 1003.

INDUSTRIAL APPLICABILITY

The present invention is suitable for use in a device for performing stochastic optimization. For example, the present invention can be used for learning a predictive model used in the field of machine learning.

REFERENCE SIGNS LIST

10 differential information extraction unit
20 end condition determination unit
30 number-of-improvements decision unit
40 provisional solution improving unit 50 function information storage unit
100 stochastic optimization device

What is claimed is:

1. A stochastic optimization device comprising a hardware processor configured to execute software code to:
receive input of a function for a predictive machine learning model and a provisional solution of the function, and calculate a first-order differential and a second-order differential in the provisional solution of the function that is input;
train the predictive machine learning model so that a final solution to the function that the predictive machine learning model uses is more accurate that the provisional solution, by:
determining whether to continue updating of a solution in the function, based on the provisional solution;
deciding a number of updates of the provisional solution, based on the provisional solution, the first-order differential, and the second-order differential;
repeatedly performing a process of updating the provisional solution as many times as the decided number of updates based on the first-order differential and the second-order differential, and output the updated provisional solution, including:
updating a second provisional solution using a value obtained by multiplying a second-order differential matrix in the second provisional solution by a difference between a first provisional solution and the second provisional solution and adding a first-order differential vector in the first provisional solution to a result of the multiplication,
wherein the second provisional solution is a current provisional solution, and the first provisional solution is the provisional solution when the number of updates was decided; and
determining whether to continue updating of the solution in the function, based on the updated provisional solution, wherein
a number of times the provisional solution is ultimately updated is reduced even in a case in which a parameter representing a structure of the function is not given, while still achieving a specified accuracy in the final solution to the function that the predictive machine learning model uses, such that processing time by the hardware processor in training the predictive machine learning model to be more accurate is reduced.

2. The stochastic optimization device according to claim 1, wherein the hardware processor is configured to execute the software code to estimate the parameter of the function from a maximum eigenvalue of the second-order differential matrix, and decide the number of updates of the provisional solution using the estimated parameter.

3. The stochastic optimization device according to claim 1, wherein the hardware processor is configured to execute the software code to stochastically designate the function, to approximate differential information.

4. The stochastic optimization device according to claim 1, wherein the hardware processor is configured to execute the software code to output an average of calculated second provisional solution as updated the number of times.

5. The stochastic optimization device according to claim 1, wherein the hardware processor is configured to execute the software code to determine to stop updating of the solution when the provisional solution has converged to an optimum solution.

6. A stochastic optimization method performed by a hardware processor and comprising:
receiving input of a function for a predictive machine learning model and a provisional solution of the function, and calculate a first-order differential and a second-order differential in the provisional solution of the function that is input;
training the predictive machine learning model so that a final solution to the function that the predictive machine learning model uses is more accurate that the provisional solution, by:
determining whether to continue updating of a solution in the function, based on the provisional solution;
deciding a number of updates of the provisional solution, based on the provisional solution, the first-order differential, and the second-order differential;
repeatedly performing a process of updating the provisional solution as many times as the decided number of updates based on the first-order differential and the second-order differential, and output the updated provisional solution, including:
updating a second provisional solution using a value obtained by multiplying a second-order differential matrix in the second provisional solution by a difference between a first provisional solution and the second provisional solution and adding a first-order differential vector in the first provisional solution to a result of the multiplication,
wherein the second provisional solution is a current provisional solution, and the first provisional solution is the provisional solution when the number of updates was decided; and
determining whether to continue updating of the solution in the function, based on the updated provisional solution, wherein
a number of times the provisional solution is ultimately updated is reduced even in a case in which a parameter representing a structure of the function is not given, while still achieving a specified accuracy in the final solution to the function that the predictive machine learning model uses, such that processing time by the hardware processor in training the predictive machine learning model to be more accurate is reduced.

7. The stochastic optimization method according to claim 6, wherein the parameter of the function is estimated from a maximum eigenvalue of the second-order differential matrix, and the number of updates of the provisional solution is decided using the estimated parameter.

8. A non-transitory tangible computer readable information recording medium storing a stochastic optimization program that is executable by a hardware processor to perform a method comprising:
receiving input of a function for a predictive machine learning model and a provisional solution of the function, and calculate a first-order differential and a second-order differential in the provisional solution of the function that is input;
training the predictive machine learning model so that a final solution to the function that the predictive machine learning model uses is more accurate that the provisional solution, by:
determining whether to continue updating of a solution in the function, based on the provisional solution;
deciding a number of updates of the provisional solution, based on the provisional solution, the first-order differential, and the second-order differential;
repeatedly performing a process of updating the provisional solution as many times as the decided number of updates based on the first-order differential and the second-order differential, and output the updated provisional solution, including:

updating a second provisional solution using a value obtained by multiplying a second-order differential matrix in the second provisional solution by a difference between a first provisional solution and the second provisional solution and adding a first-order differential vector in the first provisional solution to a result of the multiplication, wherein the second provisional solution is a current provisional solution, and the first provisional solution is the provisional solution when the number of updates was decided; and determining whether to continue updating of the solution in the function, based on the updated provisional solution, wherein a number of times the provisional solution is ultimately updated is reduced even in a case in which a parameter representing a structure of the function is not given, while still achieving a specified accuracy in the final solution to the function that the predictive machine learning model uses, such that processing time by the hardware processor in training the predictive machine learning model to be more accurate is reduced.

9. The non-transitory tangible computer readable information recording medium according to claim 8, wherein the parameter of the function is estimated from a maximum eigenvalue of the second-order differential matrix, and the number of updates of the provisional solution is decided using the estimated parameter.

* * * * *